United States Patent [19]

Mabuchi

[11] 4,057,677
[45] Nov. 8, 1977

[54] ADAPTER

[75] Inventor: Kenichi Mabuchi, Tokyo, Japan

[73] Assignee: Mabuchi Motor Co., Ltd., Tokyo, Japan

[21] Appl. No.: 645,626

[22] Filed: Dec. 31, 1975

Related U.S. Application Data

[62] Division of Ser. No. 467,305, May 6, 1974, Pat. No. 3,998,516.

[30] Foreign Application Priority Data

May 6, 1974   Japan .............................. 49-467305[U]

[51] Int. Cl.$^2$ .............................................. H01M 2/10
[52] U.S. Cl. .................................... 429/100; 429/121
[58] Field of Search ............... 136/173, 181; 339/153, 339/154; 429/100, 121

[56] References Cited

U.S. PATENT DOCUMENTS

| 2,452,917 | 11/1948 | Forstrom | 339/258 A |
| 3,220,886 | 11/1965 | Simonton | 136/173 |
| 3,684,583 | 8/1972 | Lehnen et al. | 136/173 |
| 3,736,189 | 5/1973 | Ciliberti | 136/181 X |
| 3,969,148 | 7/1976 | Trattner | 136/173 |

FOREIGN PATENT DOCUMENTS 525,754   9/1940   United Kingdom .......... 339/262 RR Primary Examiner—Roy Lake
Assistant Examiner—Neil Abrams

[57] ABSTRACT

An adapter designed to enable a battery, whose shape and dimensions are non-standard, to be housed in an electric appliance such as a model, toy, or portable electric appliance, which has a battery compartment designed to house a standard battery such as type U1, U2 or U3.

2 Claims, 30 Drawing Figures

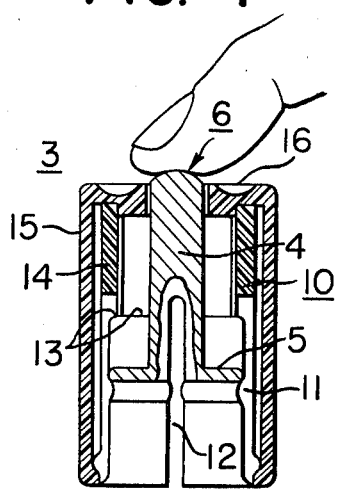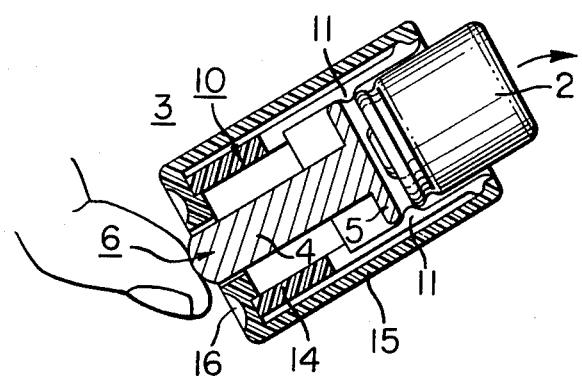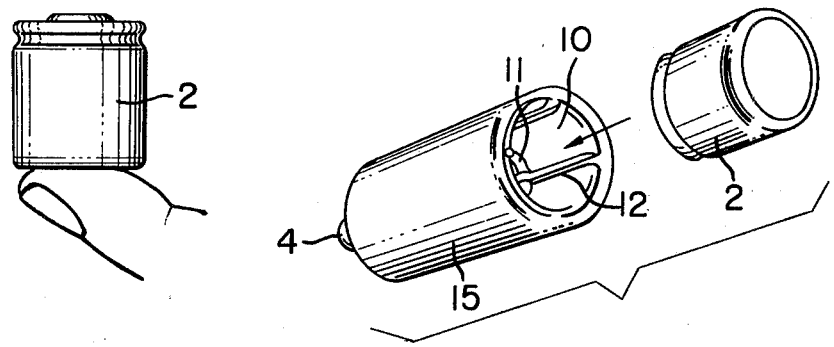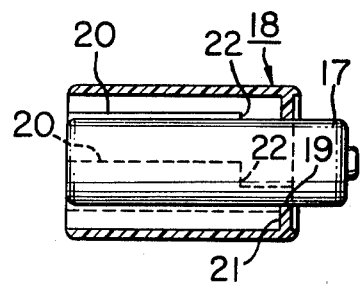

FIG. 8A  FIG. 8B  FIG. 8C
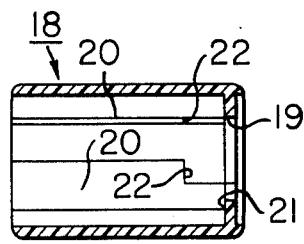
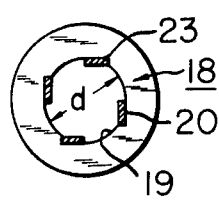
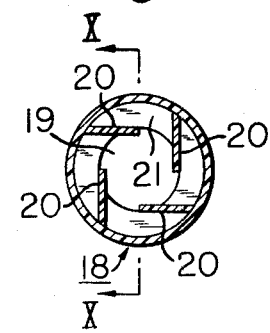
FIG. 9  FIG. 10
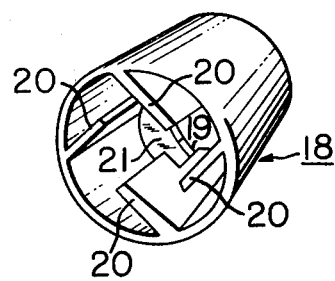
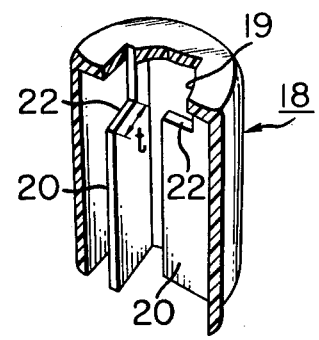
FIG. 11  FIG. 12
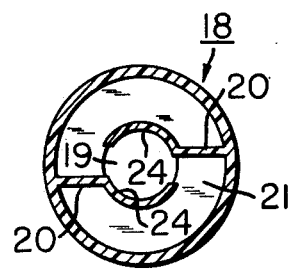
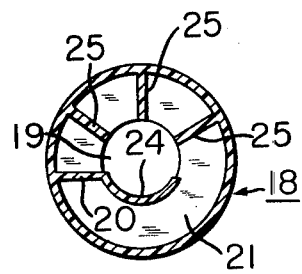

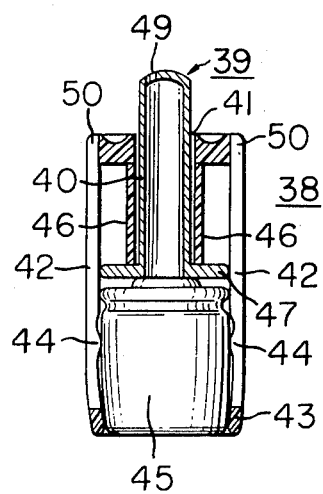
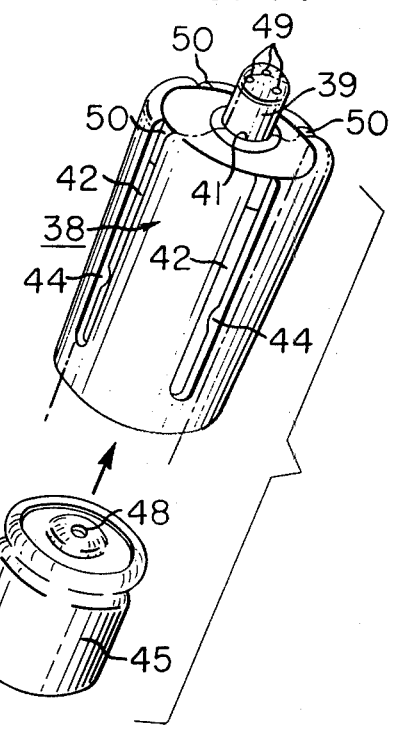
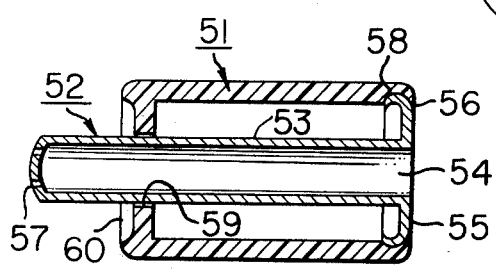
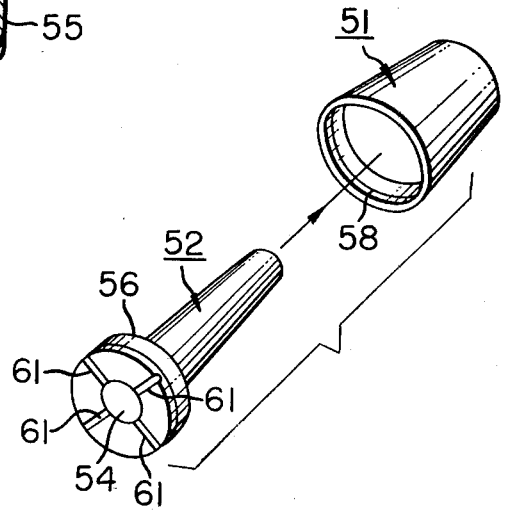
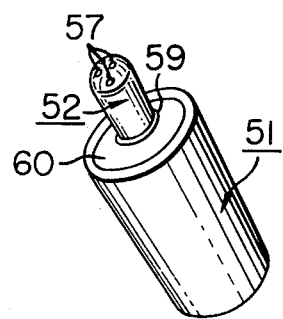

FIG. 21
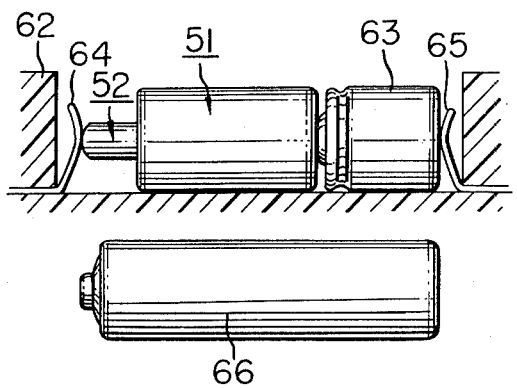
FIG. 22 A
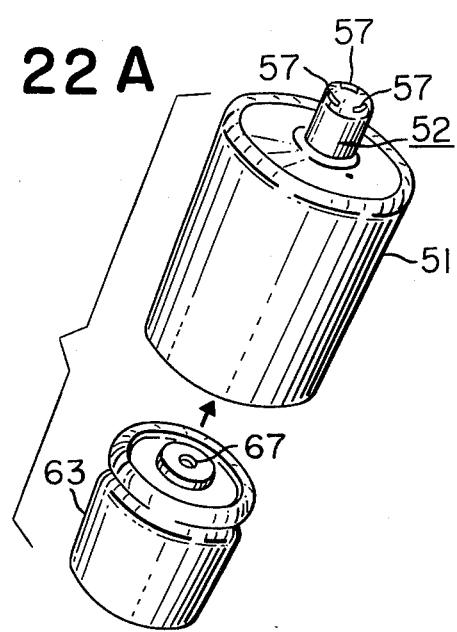
FIG. 23
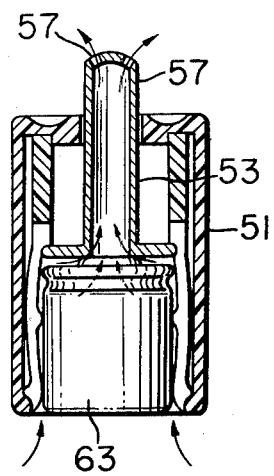
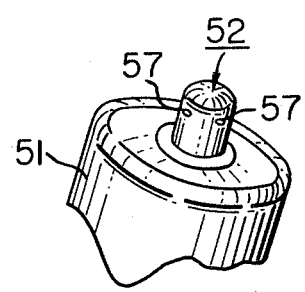
FIG. 22B

ADAPTER

This is a division of application Ser. No. 467,305 filed May 6, 1974 now U.S. Pat. No. 3,998,516.

BACKGROUND OF THE INVENTION:

1. Field of the Invention

This invention relates generally to an adapter, and more particularly to an adapter designed to enable a battery whose shape and dimesnions are non-standard, to be housed in an electric appliance which has a battery compartment designed to house a standard battery such as type U1, U2 or U3.

2. Description of the Prior Art

Vigorous development is now under way in nickel-cadmium (Ni-Cd) batteries. Particularly, Ni-Cd batteries with valves to release gas produced during overcharging are very convenient when used in various appliances because of low internal voltage drop due low internal resistance, rapid charging (about 5 to 15 minutes), and dischargeability to the extent that the terminal voltage drops approach zero.

However, Ni-Cd batteries of this type are characterized by small size, large current capacity and rapid charging, and usually have different shape and dimensions from standard batteries such as the U1, U2 and U3 types.

However, it would not be desirable to modify only for this reason, the battery compartment of an electric appliance which was originally designed to house standard batteries. This might lead to substantial changes in the design of the electric appliance in some cases. Therefore, it is desirable to enable non-standard batteries to be housed in battery compartments designed for batteries of standard shape and dimensions by adding an adapter terminal to the aforementioned non-standard batteries. Meanwhile, in view of the fact that electric appliances which can house non-standard batteries such as the aforementioned Ni-Cd batteries and chargers for such batteries have been successfully developed, it would not be desirable to parmanently contain such batteries in a dummy container of standard shape and dimensions.

It is sometimes desired to use or change the Ni-Cd batteries outside of a dummy container.

SUMMARY OF THE INVENTION

It is an object of the present invention to provide an adapter to enable batteries with non-standard dimensions to be housed in a battery compartment designed for standard batteries.

It is another object of the present invention to provide an adapter designed to make it possible to easily remove a battery housed therein.

It is another object of the present invention to provide an adapter which has resilient supporting members to make it easy to remove a battery therefrom by means of the force of the supporting members applied to the battery shoulder.

It is another object of the present invention to provide an adapter designed to hold a battery utilizing ribs of a resilient material.

It is another object of the present invention to provide an adapter designed to hold a battery utilizing a tongue.

It is another object of the present invention to provide an adapter designed to hold a battery by means of a hollow cylindrical body formed with slots.

It is another object of the present invention to provide an adapter designed to enable gas discharge by providing a gas vent through an adapter terminal.

It is still another object of the present invention to provide an adapter designed to facilitate gas flow by keeping an adapter terminal in contact with the electrode surface of a battery.

BRIEF DESCRIPTION OF THE DRAWINGS

FIG. 4 is an illustration showing a non-standard battery which is about to be inserted into the abovementioned adapter.

FIG. 5 is an illustration showing a battery which is about to be removed from the adapter.

FIG. 6 is a perspective view of a battery which is about to be inserted into an adapter of the present invention.

FIG. 7 is a longitudinal section of a battery supported by another type of adapter embodying the present invention.

FIG. 8A is a longitudnal section of the adapter shown in FIG. 7 and taken along line x—x of FIG. 8c. FIG. 8B is a top view, and FIG. 8C a bottom view thereof.

FIG. 9 is a perspective view of the adapter viewed from the bottom.

FIG. 10 is a cut-away perspective view of the adapter of FIG. 9.

FIGS. 11 and 12 are cross-sections of other types of adapters embodying the present invention, showing the configuration of resilient rib members used in the adapter.

FIG. 16 is a longitudinal section of an adapter embodying the present invention designed to have the same shape and dimensions as a U2 battery, and FIG. 17 is a perspective view thereof.

FIG. 18 is a longitudinal section of an adapter embodying the present invention designed to have the same shape and dimensions as a U3 battery.

FIG. 19 is a perspective view of an adapter body and an adapter terminal to be fitted therein.

FIG. 20 is a perspective view of the adapter shown in FIG. 18.

FIG. 21 is an illustration showing the adapter housed in a battery compartment together with a battery.

FIGS. 22 (A and B) and FIG. 23 are illustrations showing the gas discharging function incorporated in an adapter.

DETAILED DESCRIPTION OF THE EMBODIMENTS

Figure 1:
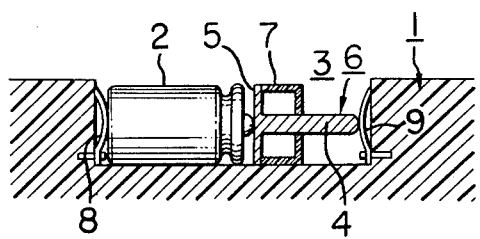
FIG. 1 is a longitudinal view partly in section of an embodiment of the present invention designed to be disposed in a U3 battery compartment.

Although certain types of Ni-Cd batteries mentioned above have the same diameter as a U3-type battery, they are different in length from the U3-type. Therefore, when housing a battery whose shape and dimensions are non-standard, for example, a Ni-Cd battery 2 in a battery compartment of housing 1 constructed to house a U3-type battery, as shown in FIG. 1, an adapter 3 is added. The adapter 3, in this embodiment, has a conductive member or adapter terminal 6 having a rod 4 and a disc 5, and a tubular insulator body 7 constructed to have the same diameter as the battery 2. The length of the adapter terminal 6 is such that it can adequately compensate for the insufficient length of the battery 2. Numerals 8 and 9 refer to connecting terminals which are connected to a load (not illustrated) such as a motor.

In this case, the gap between the insulator body 7 and the connecting terminal 9 is designed to be large enough for a fingertip to enter so that the battery 2 can be easily removed from the battery housing 1. The adapter 3 and the battery 2 are constructed separately so that only the battery 2 may be used in other electrical appliances or may be charged with a battery charger.

Figure 2:
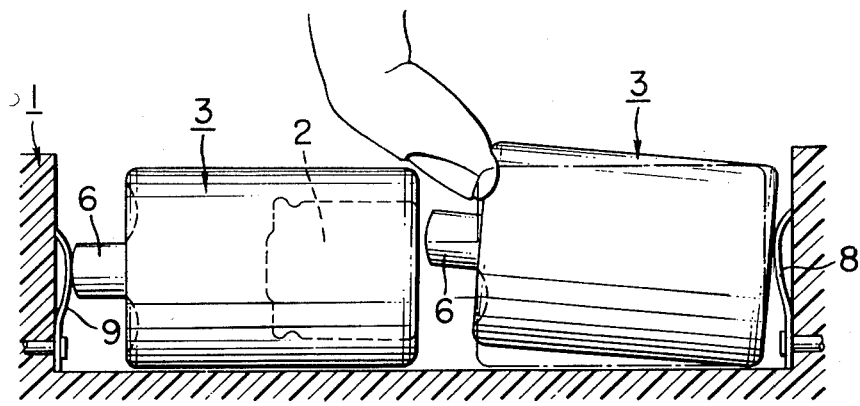
FIG. 2 shows an embodiment of the present invention designed to be disposed in a U1 battery compartment.

In the embodiment shown in FIG. 2, two adapters 3 which have the same shape and dimensions as a U1-type battery are axially housed in series in the battery housing 1. As described above, a gap large enough for a fingertip to be inserted is provided between the two adapters 3 for easy removal.

Figure 3:
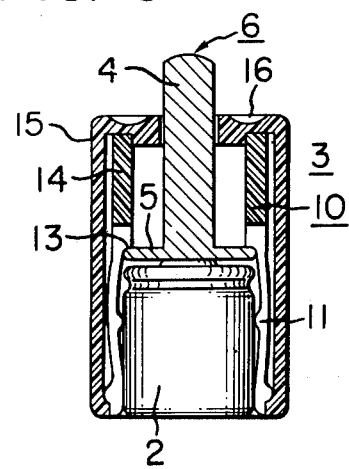
FIG. 3 is an illustration of an adapter embodying the present invention which is designed to have the shape and dimensions as a U1 battery.

In the embodiment shown in FIGS. 3 through 6, numerals 2, 3, 4, 5 and 6 correspond to like numerals in FIG. 1 and as more clearly shown in FIGS. 4 and 6, a resilient retaining sleeve 10 has a cylinder portion thereof integral with the annular portion 14, the lower end portion of the retaining sleeve 10 having several axial slots indicated at 12 to provide elasticity. The lower portion mentioned above has a shoulder portion 13 which serves as a stopper for the disc 5 of the adapter terminal 6, and an inner ridge 11 which elastically retains the battery 2 and at the same time serves as a stopper for the disc 5. The retaining sleeve 10 is inserted into the tubular body 15, with the lower end of the sleeve 10 being fitted to the lower end of the body 15. The depression 16 is formed in an end plate (no numeral) of the body 15, the end plate being formed with a coaxial hole of substantially the same diameter as the rod 4. In housing the battery 2, the sleeve 10 is first inserted into the body 15 and then the adapter terminal 6 is introduced as shown in FIGS. 4 and 5. Then the battery 2 is forced into the retaining sleeve 10 as shown in FIGS. 4 and 6. In this case, the outer diameter of the battery 2 is slightly larger than the inner diameter of the ridge 11 of the retaining sleeve 10, so that the ridge 11 is pushed outwardly by the battery 2, and thereby elastically retains the battery 2, as clearly shown in FIG. 3. When the battery 2 is forced fully into the retaining sleeve 10, the disc 5 of the adapter terminal 6 abuts against the shoulder 13 of the retaining sleeve 10, as shown in FIG. 3. The distance between the tip of the adapter terminal 6 and the bottom of the battery 2 is designed to be equal to the length of a U1-type battery, for instance, and the rod 4 of the adapter terminal 6 protrudes approximately 1 centimeter beyond the body 15. The length of the rod 4 is equal to the difference between the length of the battery 2 and a standard U-1 battery.

In this embodiment, moreover, the disc 5 of the adapter terminal 6 is flat and as large in diameter as the battery 2. Therefore, when the battery 2 is inserted with the right polarity, the disc 5 electically contacts the positive terminal of the battery 2, as shown in FIG. 3. However, when the battery 2 is accidentally inserted with the wrong polarity, the disc 5 is designed not to electrically contact the negative terminal of the battery 2 because they are separated by the insulator casing (no numeral) which covers the outer surface of the battery 2 and is folded at its end over the bottom of the battery 2.

When the adapter 3 housing the battery 2 as shown in FIG. 3 is placed in the battery housing 1 as shown in FIG. 2, the gap between the two adapters 3 is large enough for a finger to enter since the rod 4 of the adapter terminal 6 protrudes by approximately 1 centimeter. This makes it possible to remove the adapter 3 from the battery housing 1 with a fingertip engaging the depression 16 provided on top of the dummy container 15. The battery 2 itself can be removed from body 15 by pushing the top of the adapter terminal 6. By doing so, the disc 5 of the adapter terminal 6 pushes the battery 2 out of the retaining sleeve 10. At the point where a shoulder portion (no numeral) of the battery 2 passes over the ridge 11 as shown in FIG. 5, the retaining sleeve 10 quickly pushes on the shoulder portion of the battery 2 while returining to its original free state, and thereby pops the battery 2 out of the dummy container 15.

As described above, the present invention enables batteries whose shape and dimensions are non-standard to be housed in a battery housing constructed in accordance with the shape and dimensions specified for prevailing battery standards. Consequently, Ni-Cd batteries having capabilities such as large current capacity and rapid charging can be easily used without design changes in existing electric appliances constructed in accordance with the prevailing standards. In addition, since such a non-standard battery can be easily removed from the adapter, not only it can be used in any electric appliance having a battery housing designed for the shape and dimensions of the non-standard battery, but also it can be recharged with any charger designed to accept the non-standard battery without any design change.

Next, an embodiment of an adapter formed in one piece will be described with reference to FIGS. 7-12.

In these figures, the numeral 17 refers to a battery to be inserted, and the numeral 18 to an adapter body to compensate for the substandard outer diametr of the battery 17. The adapter body 18 is constructed in the form of a tube, and has an opening 19 through an end 21. The opening 19 is formed to be equal to or larger than the outer diameter of the battery 17, and is designed so that the battery 17 protrudes from the top of the body 18 when the battery 17 is inserted. Axially disposed rib members 20 are provided which extend inwardly from the inside wall of the body 18 to contact, for example, tangentailly the circumference of the battery 17, and are constructed in such a way that the diameter of a circle inscribed within the rib members 20 is slightly smaller than the outer diameter of the battery 17.

One end of the rib members 20 is formed integrally with the end 21 of the body 18 to facilitate molding. In order to enable elastic deformation of the rib members 20 in such a configuration, notches 22 are provided in the rib members 20 near the end 21. When the battery 17 is inserted into the adapter body 18 of the abovementioned constuction, as shown in FIG. 7, the rib members 20 ar expanded outwardly by the circumference of the battery 17 to elastically or resiliently retain the battery 17. The battery 17 protrudes through the opening 19 of the body 18. Thus, the body 18 and the battery 17 are housed properly into the battery housing (not illustrated) of an electric appliance, which is designed to house a U2-type battery.

In this case, the length of the combination is represented by the length of the battery 17 itself, and the outer diameter is that of the adapter body 18.

The body 18 of the aforementioned construction is designed to be molded in a single operation using a suitable material such as a plastic. The adapter is injection molded utilizing a male mold with an external shape corresponding to the inside configuration of the body 18 and a female mold with an internal shape corresponding to the external shape of the body 18. In this case, the aforementioned male mold has a cylindrical shape corresponding to the inner diameter of the tubular body 18. Slots corresponding to the abovementioned rib members 20 are provided through the cylindrical shape. The slots are provided all the way through the cylindrical shape without any provisions for notches in the rib members 20. On the other hand, the female mold has a cylindrical cavity corresponding to the extenal shape of the body 18, and, at the bottom of the cavity, a table-like protrusion corresponding to the abovementioned opening 19, and stripshaped protrusions, corresponding to notches 22, on the table-like protrusions.

In other words, in this adapter of the present invention, consideration is given to enable the notches 22 in the aforementioned rib members 20 to be molded in a single molding operation in which the opening 19 is formed not in the form of a full circle, but as square cuts 23 on part of its arc, as clearly illustrated in FIG. 8B. Thus, the notches 22 can be molded from the side opening 19 using the cuts 23. Although the cuts 23 in the figure have a triangular edge shape, it is needless to say that the shape of the cuts 23 is determined by the relation between the depth $t$ of the notches 22 in the rib members 20 and the diameter $d$ of the opening 19.

FIG. 11 is a bottom view of another embodiment of the prsent invention whose numerals correspond to like numerals in FIG. 8. In this figure, rib membes 20 have concave curvature portions 24, which elastically retain the battery 17. In this case again, it is needless to say that the notches 22 as shown in FIGS. 7 through 10 are molded from the side opening 19 . Finally, as shown in FIG. 12, in which the numerals 18, 19, 20, 21 and 24 correspond to those in FIG. 11 spacer members 25 are provided extending from the inside wall of the body 18 toward the center, which serve as spacers to support the battery 17 at the center. The battery 17 is coaxially aligned with the center axis by means of the spacer members 25, and is elastically supported by the rib members 20 having the concave curvature portions 24.

As described above, an adapter as that of this embodiment can elastically retain the battery 17 with the rib members 20 simply by providing the rib members 20 extending from the inside wall tubular body 18. The adapter also has an advantage that it can be molded in a single molding operation. Another advantage is that it is sufficient only to make up for insufficient battery diameter, without provisions to compensate for length by such means as an adapter terminal.

Figure 13:
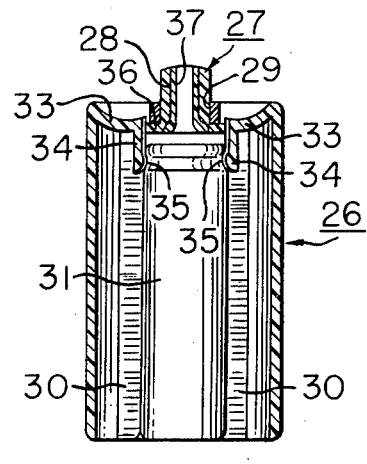
FIG. 13A is a longitudinal section of an adapter with a battery.
FIG. 13B is a longitudinal section of the same adapter without the battery.
FIG. 13C is a top view of the adapter shown in FIG. 13B.
FIG. 13D is a bottom view of the adapter shown in FIG. 13B.
Figure 13:
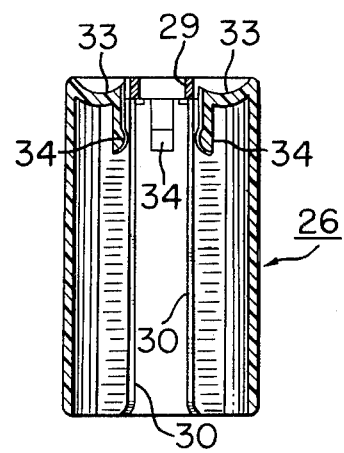
Figure 13:
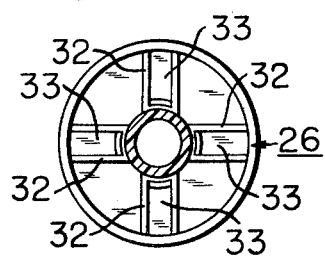
Figure 13:
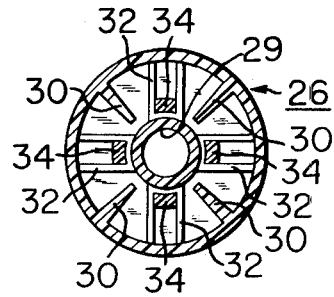
Figure 14:
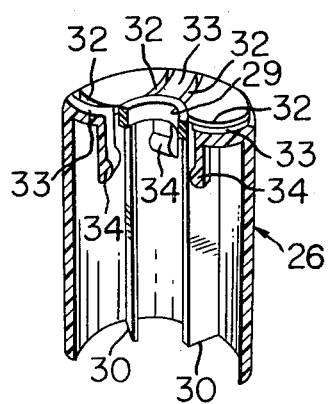
FIG. 14 is a cut-away perspective view of a part of the adapter shown in FIG. 13B.
Figure 15:
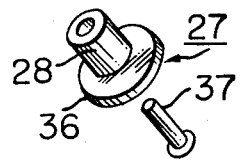
FIGS. 15A and 15B are perspective views of an adapter terminal.
Figure 15:
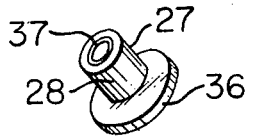

FIGS. 13 through 15 show another embodiment of the present invention which is designed to enable the non-standard battery shown in FIG. 7 to be housed in a U1-type battery housing.

In these figures, the numeral 26 refers to a tubular adapter body. An opening 29 through which a rod 28 of an adapter terminal 27 is slidable is provided through an end plate of the adapter (no numeral). The body 26 has rib members 30, which extend from the inside wall of the body 26 toward the center to position a battery 31 coaxially in the body 26.

Slots 32 are provided, and tongue-shaped members 33 extend from the end plate from the opening 29 of the body 26. Engaging members 34 are formed on the tongue-shaped members 33, when necessary, and raised portions are formed on the inside of the engaging members 34 to grasp a groove 35 in the shoulder of the battery 31 inserted into the body 26.

As clearly shown in FIGS. 15A and 15B, an adapter terminal 27 to be inserted through the opening 29 consists of an insulator member having a tube portion 28 and disc portion 36, and an eyelet-like hollow conductor member 37 formed by drawing process, for example. When the adapter terminal 27 is inserted into the body 26, the disc portion 36 contacts the inner end face of the end plate, and the positive terminal of the battery 32 electrically contacts the hollow conductor member 37, the rod portion 28 protruding from the end plate of the body 26, as shown in FIG. 13A. In the embodiment shown, the distance between the tip of the adapter terminal 27 and the bottom surface of the battery 31 is equal to the lngth of a U1-type battery. The outer diameter of the body 26 is, of course, equal to the outer diameter of a U1-type battery. In the case of the embodiment shown, the battery 31 is elastically retained by the engaging members 34 of the tongue-shaped members 33, as shown in FIG. 13A, because the length of the body 26 is almost equal to the length of the battery 31. When the battery 31 is inserted into the body 26, the engaging members 34 of the tongue-shaped members 33 are expanded by the shoulder of the battery 31, and the tongue-shaped members 33 elastically retain the battery 31 because the tongue-shaped members 33 which are separated from the adjacent end face by the slots 32, are elastically deformed.

When removing the battery 31 from the body 26, the tip of the adapter terminal 27 is pushed downwardly, and the disc portion 36 depresses the positive terminal of the battery 31. When the raised portions of the engaging members 34 are about to be separated from the shoulder of the battery after being detached from the groove 35 of the battery 31, the battery 31 pops out because the engaging members 34 quickly tend to elastically return to their original free state. In this embodiment, the elastic retension of the battery 31 is fully effected by separating the tongue-shaped members 33 from the adjacent end plate by the slots 32. However, when the engaging members 34 alone can provide adequate elasticity, it would be sufficient to have the engaging members alone extend from the inside of the end plate.

As described above, when the length of the battery 31 to be inserted is relatively close to the desired standard size such as that of a U1-type battery, as in the case of this embodiment, the rod portion 28 of the adapter terminal 27 becomes necessarily short, and therefore the elastic retaining portions for the battery 31 are near the end plate of the body 26. For this reason, both the tongue-shaped members 33 formed on the end plate and the engaging members 34, when necessary, constitute the elastic retaining portions.

This makes it possible to pop the battery 31 out of the body 26 by a slight movement of the adapter terminal 27, and to construct the body 26 in one piece through an easy molding process.

In the abovementioned embodiment, the adapter terminal 27 is provided because the length of the battery 31 is slightly smaller than the desired standard size such as that of a U1-type battery, for example. However, when constructing an adapter to be housed in a U2-type battery housing, an adapter terminal 27 is not necessary because the length of the battery 31 shown in the figures is the same as that of a U2-type battery.

In such a case, the construction of the embodiment shown in the figures can be changed as follows:

1. the length of the body 26 is made smaller than that of the battery 31.
2. the inner diameter of the opening 29 of the body 26 is made equal to or larger than the outer diameter of the battery 31.
3. the battery 31 is made to protrude from the body 26 through the opening 29.
4. the tongue-shaped members 33 and the engaging members 34, when necessary, are made to retain elastically the circumference of the battery 31.
5. When removing the battery 31, the battery 31 depress to a position where the shoulder of the battery 31 is detached from the raised portions of the engaging members 34 to be popped out using the elastic return of the engaging members 34.

FIGS. 16 and 17 show an embodiment which is designed to enable the non-standard battery shown in FIG. 3 to be housed in U2-type battery housing. FIG. 16 shows a longitudinal section of an adapter of this embodiment, and FIG. 17 is a perspective view of the same adapter. In the figures, the numeral 38 refers to a tubular adapter body. As in the case of the aforementioned embodiment, an opening 41 through which a rod portion 40 of an adapter terminal 39 extends is provided through the end plate of the body 38.

Axial slots 42 are provided through the wall of the body 38, leaving an annular portion 43 of the bottom portion of the body 38. An annular battery retaining ridge 44 is provided on the inside wall of the body 38, and as shown in FIG. 16, when a battery 45 is inserted into the body 38, the annular ridge is pushed outwardly by the circumference of the bttery 45, and thus the battery 45 is elastically retained by means of the ridge 44 and the annular portion 43 at the bottom.

Inside the body 38, a stopper 46 is provided to stop the adapter teminal 39 at a selected position. When the battery 45 is properly inserted into the body 38, a disc portion 47 of the adapter terminal 39 is stopped at the selected position by the stopper 46 to ensure electric contact with the positive terminal of the battery 45. As shown in FIG. 16, when the battery 45 is inserted into the body 38, the distance between the bottom surface of the battery 45 and the tip of the adapter terminal 39 is equal to the length of, for example, a U2-type battery, and the diameter of the body 38 is also designed to be equal to the diameter of a U2-type battery.

Also as shown in FIG. 16, the body 38 into which a non-standard battery is inserted can be housed in a U2-type battery housing just like a standard U2-type battery. As for a Ni-Cd battery having a gas release valve, the rod portion 40 of the adapter terminal 39 is hollow, and through the tip thereof gas vents 49 are provided to prevent a gas release hole 48 at the positive terminal of the battery from being closed by the adapter terminal 39. The operation of removing the battery 45 from the body 38 is similar to that of the other embodiments as shown in FIGS. 3 and 13. As in the case of the embodiments shown in FIGS. 7 and 13, the adapter can be molded in one molding operation from a plastic material. In this case, protrusions corresponding to the abovementioned slots 42 are provided on the inside wall of the female mold, and these protrusions are designed to contact the outer surface of the male mold during the molding operation. Grooves 50 extending to the slots 42 are provided on the body 38 so that the body 38 can be extracted from the female mold despite the protrusions on the inside wall of the female mold. An annular recess is provided in the male mold to mold the ridge 44 on the inside wall of the body 38. Consequently, when the male and female molds are separated after thermosetting, the molded body 38 is extracted together with the male mold. Then, the body 38 can be extracted from the male mold because the ridge 44 is disengaged from the recess in the male mold due to elastic deformation of the body 38.

As described above, the body 38 of this embodiment can be formed in a single molding operation, and has only two components, mainly the body 38 and the adapter terminal 39. Moreover, the slots 42 provided through the body 38 have the function of providing elasticity for the tubular portion of the body 38 as well as the function of cooling the inserted battery 45. The body 38 has an advantage in that the battery 45 can be easily inserted into and removed from the body 38.

Next, an embodiment with a gas releasing provision to be used with a Ni-Cd battery having a gas release valve will be described, referring to FIGS. 18 to 23.

Since the adapter terminals used in the aforementioned embodiments are supposed to be formed hollow by a drawing process in view of material conservation, it is desired, when used with a Ni-Cd battery having a gas release valve, to make a provision for discharging hydrogen gas released from the battery through the hollow portion of the adapter terminal.

In these figures (18–23) the numeral 51 refers to an adapter body, and the numeral 52 to an adapter terminal. The adapter terminal 52 is composed of a hollow rod portion 53 and a disc portion 55 with an opening 54 through its center. The edge 56 of the disc portion 55 resiliently engages in a circumferential groove 58 in the body 51. Gas vents 57 are provided through the tip of the hollow rod portion 53. The body 51 is constructed of an insulator material in the shown embodiment. The end plate (no numeral) of the body 51 has an opening 59 through which the hollow rod portion 53 of the adapter terminal 52 extends. A recessed portion 60 is provided around the opening 59 so that the body 51 can be easily removed with a fingertip.

Moreover, in the end surface of the disc portion 55 of the adapter terminal 52, radial grooves 61 are provided, to facilitate air flow through the hollow rod portion 53 and gas vents 57 when a battery 63 is inserted into a battery housing 62 together with the adapter body 51 as shown in FIG. 21. By doing so, hydrogen gas released from the battery 63 escapes through the gas vents 57.

An adapter of this type has two components; the body 51 formed by molding from plastic and the adapter terminal 52 formed hollow by drawing, which are assembled simply by engaging the edge 56 with the groove 58. As clearly shown in FIG. 21, an adapter body 51 of this construction is inserted into the battery housing 62 having electrical connecting terminals 64 and 65, together with the battery 63. The embodiment represents the adapter body 51 and the battery 63 inserted into the battery housing 62 for a U3-type battery. The diameter and length of the Ni-Cd batteries mentioned above vary with their capacity. However, the battery 63 which is equivalent to conventional U3-type battery and is almost the same in diameter as a U3-type and is different only in length. Consequently, it is sufficient to add the adapter of this embodiment to the battery 63 as shown in FIG. 21. Thus, Ni-Cd batteries can be used satisfactorily in any electrical appliances designed for conventional U3-type dry batteries without design changes. The adapter terminal 52 used in an adapter of this type is, as stated usually formed hollow by a drawing process in view of material conservation. However, there is a possibility that hydrogen gas produced during overcharging might accumulate in the abovementioned hollow portion and mix with oxygen in the air, and in some cases, be exploded by a tiny spark. This danger can be eliminated in this embodiment because the gas vents 61 facilitate gas circulation. FIGS. 22A and 22B show the relationship between the adapter terminal gas vents 57 provided through the tip of the adapter terminal 52 and the gas releasing vent 67 of a Ni-Cd battery. In this case, the tip of the adapter terminal 52 is finished semispherically as shown to prevent the gas vents 57 from being closed by foreign matter such as an external connecting terminal.

By terminating semispherically, the tip of the adapter terminal 52 can smoothly slide on a connecting terminal whereby the adapter can be easily inserted in a battery housing.

As shown in FIG. 23, the gas vents 57 have a ventilating effect as shown by arrows in the figure, which gives the adapter a cooling effect on the battery 63 as well as the gas dispersion effect.

Numerous changes may be made in the above described adapters, and different embodiments of the present invention may be made without departing from the scope thereof. Thereof, it is intended that all matter contained in the foregoing description and in the accompanying drawings be intepreted as illustrative and not in a limiting sense.

What is claimed is:

1. An adapter to enable a non-standard sized battery to be operatively placed in a battery compartment designed to house a standard sized battery which is larger than the non-standard size battery, said adapter comprising an elongated, molded plastic tubular body having a transverse wall integral with one end thereof and with an opening through said end wall, said tubular body having a shorter axial length than a non-standard sized battery whereby the non-standard sized battery extends outwardly of said tubular member when the non-standard sized battery is contained within said adapter, said tubular body further including a plurality of inwardly directed and axially extending resilient ribs formed integrally with said transverse end wall and the inside surface of said tubular body for releasably holding a portion of the non-standard sized battery contained within said adapter, each of said ribs including a notch extending axially from the inner surface of said transverse end wall and along at least a portion of the inwardly directed edge of said ribs, the opening in said transverse end wall including a plurality of cuts therein that correspond to the shape and depth of each said notch in each said rib whereby the unnotched portion of each said rib contacts and resiliently retains the non-standard sized battery and whereby said adapter is capable of being manufactured by a molding process in a single operation utilizing cooperating male and female molds.

2. The adapter according to claim 1 wherein said ribs extend generally chordally inwardly from the inside wall of said tubular body and wherein said ribs have a free end that is spaced from the inside surface of said tubular body.

* * * * *